A. ROFF.
SELF-ADJUSTING TREE-SHIELD.
No. 187,317. Patented Feb. 13. 1877.
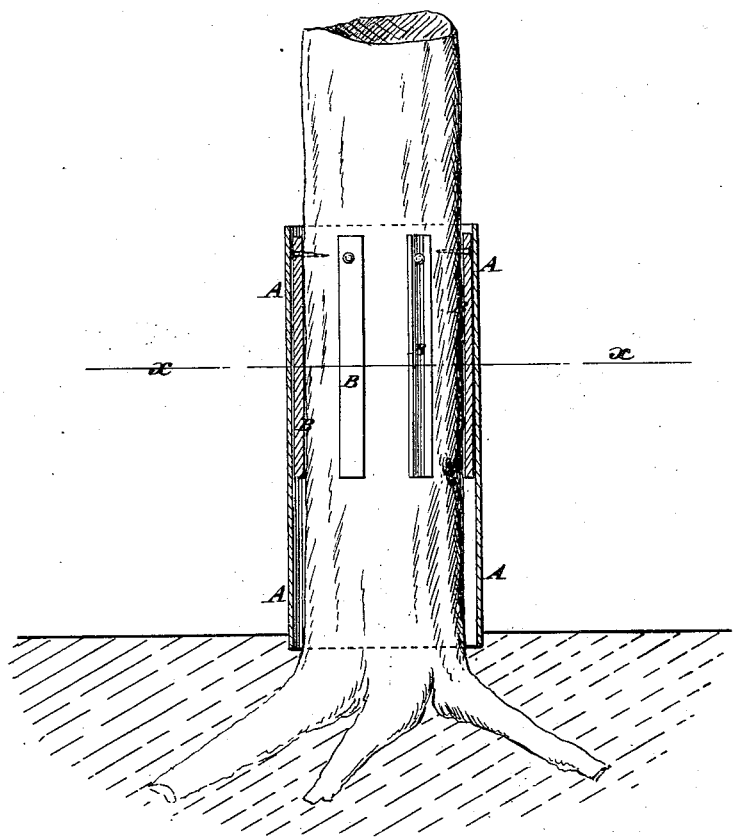
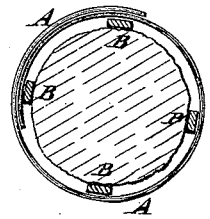
WITNESSES:
INVENTOR:

UNITED STATES PATENT OFFICE.

ALMON ROFF, OF SOUTHPORT, CONNECTICUT.

IMPROVEMENT IN SELF-ADJUSTING TREE-SHIELDS.

Specification forming part of Letters Patent No. 187,317, dated February 13, 1877; application filed December 30, 1876.

*To all whom it may concern:*

Be it known that I, ALMON ROFF, of Southport, in the county of Fairfield and State of Connecticut, have invented an Improvement in Self-Adjusting Tree-Shield, of which the following is a specification:

Figure 1 is a vertical section of my improved tree-shield. Fig. 2 is a horizontal section of the same, taken through the line $x\ x$, Fig. 1.

Similar letters of reference indicate corresponding parts.

The object of this invention is to furnish an improved shield for protecting trees from the worms that burrow into and injure their roots, by preventing the millers from laying their eggs around the base of the trunk of the tree.

The invention will first be described in connection with the drawing, and then pointed out in the claim.

The worms from which this invention is designed to protect trees are hatched from eggs laid by millers in the bark of the trees at the surface of the ground where it is kept soft by moisture. The worms, when hatched, burrow their way downward to the roots, and thus injure and destroy the trees.

To prevent the millers from having access to the trees, I inclose the lower part of the trunk with a sheet, A, of lead bent around the tree, and made of such a length that its sides may overlap each other sufficiently to allow for two or three years' growth of the trees.

The shield A is coiled so closely around the trunk that the millers cannot pass down between it and the trees, and is kept from contact with the tree by thin strips, B, of wood interposed between it and the said tree. The strips B are secured in place by being tacked to the tree, and are made shorter than the height of the shield A, so that the air can circulate around the lower part of the trunk freely.

By this construction as the tree grows the shield A will expand, so as to adjust itself to the size of the trunk. Any other suitable metal may be used, but I prefer lead, as it keeps its place better without being made too heavy, yields more readily to the growth of the tree, and does not exert an inward pressure upon the tree from its elasticity.

Having thus described my invention, I claim as new and desire to secure by Letters Patent—

The combination, with a leaden sheet, A, coiled about the trunk of a tree, of strips B made fast to the tree, substantially as and for the purpose specified.

ALMON ROFF.

Witnesses:
JAMES T. GRAHAM,
C. SEDGWICK.